United States Patent [19]

Case et al.

[11] 4,431,698

[45] Feb. 14, 1984

[54] WATERPROOF PACKING

[76] Inventors: Edward M. Case, 40 Valley Forge Rd., Weston, Conn. 06883; Chester S. Hopper, Boggs Hill Rd., Newtown, Conn. 06470

[21] Appl. No.: 430,417

[22] Filed: Sep. 30, 1982

[51] Int. Cl.³ .................... B65D 53/06; F16C 33/20; F16J 15/16
[52] U.S. Cl. .................................... 428/244; 57/258; 87/1; 87/6; 277/227; 277/230; 277/DIG. 6; 308/DIG. 8; 308/DIG. 9; 384/300; 427/180; 427/226; 428/253; 428/265; 428/267; 428/268; 428/269; 428/368; 428/378; 428/392; 428/422
[58] Field of Search .......................... 87/1, 6; 57/258; 427/180, 226; 308/DIG. 8, DIG. 9; 384/300; 428/244, 253, 265, 267, 268, 269, 368, 378, 392, 422; 277/227, 230, DIG. 6

[56] References Cited

U.S. PATENT DOCUMENTS 3,306,155  2/1967  Zumeta et al. ................... 57/258
4,163,825  8/1979  Wimmer ........................ 277/227

Primary Examiner—James C. Cannon
Attorney, Agent, or Firm—Blum, Kaplan, Friedman, Silberman & Beran

[57] ABSTRACT

A low-friction, water- and steam-resistant packing suitable for both static and dynamic applications includes inorganic fiber selected from the group consisting of chemical, electrical, structural and alkali resistant glasses, ceramic, quartz, carbon and graphite materials, and dispersed and dried, but unsintered, polytetrafluoroethylene (TFE). The packing is essentially free of wetting agent and is prepared by combining the inorganic fiber with a TFE dispersion containing a wetting agent and heating the resulting combination to a temperature high enough to decompose the wetting agent but insufficiently high to sinter the particles of the dispersion.

25 Claims, 4 Drawing Figures

WATERPROOF PACKING

BACKGROUND OF THE INVENTION

Until very recently, asbestos has been the standard, most widely used material in braided "compression" packings. The recent discovery of the potential carcinogenic effects, as well as the fact that supplies of the raw material are naturally limited as well as not widely distributed geographically and, hence, subject to political restraints, has caused a wide search for alternative materials in the fluid sealing industry. In a patent issued to one of us (U.S. Pat. No. 3,306,155), it was disclosed that the substitute material, namely, glass fiber, in combination with polytetrafluoroethylene (TFE) dispersion, forms a braided packing which is effective for a number of applications. However, in order to prepare a TFE dispersion, it is necessary to incorporate a wetting agent which then becomes residual in the braided structure. Where the glass fiber packing is used in contact with water or with an aqueous solution, the presence of the wetting agent makes it possible for the solution to gradually wash out the TFE lubricant after which self-abrasion of the glass fiber takes place rapidly. Where the aqueous solution is under pressure, the elution of the lubricant takes place even more quickly.

While each of the substitute materials on the market, such as glass fiber in combination with TFE dispersion, TFE fiber, graphite filament, etc., has substantial functional merit, these combinations are considerably more expensive than the standard graphited-asbestos packing which has been the predominant braided packing for many years. The search for an economical substitute which will be equivalent in cost to graphited-asbestos packing, has not yet been successful.

Attempts have been made to incorporate graphite lubricant or other inorganic lubricants into a braided glass fiber structure. These attempts have hitherto yielded unsatisfactory results. Dry, flake graphite will not be retained by a braided glass fiber structure. When the graphite is mixed with an oil lubricant, the oil will seep out and will not be retained; furthermore, the use of oil limits the effective operating temperature range of the packing. Also, the wet, dripping packing so constructed would create both housekeeping and safety problems. Adding graphite to a more coherent, waxy lubricant would help to retain the graphite in the structure, but this mixture would fundamentally amount to a wax filler in which the graphite would have no significant value; furthermore the wax would limit the effective temperature of the packing to a very low range. An aqueous graphite dispersion also will not be retained in the braided glass fiber structure.

Experience derived from graphited-asbestos packing offers no clear path to the development of a viable graphited glass fiber packing. The ordinary asbestos yarn of commercial grade or better used in the manufacture of braided packing contains up to 25% or even more of a cotton or rayon binder which readily absorbs and forms a reservoir of lubricant, permitting the finished product to retain the lubricant within the braided structure indefinitely. Furthermore, the inherent structure of asbestos, containing multifarious voids as the result of uneven and very small and varied fibers which are incorporated into the yarn (as opposed to the smooth, regular filamentary nature of glass fiber), permits the retention of graphite-laden lubricants (or mica-laden, talc-laden or other particulate-laden mixtures) as well as flake graphite in dry, powdered form. Thus, braided asbestos packing has been easy and convenient to load with lubricants and the technique of doing so is well known.

Attempts to use the same technique on braided glass fiber have met with failure owing to the difference between the inherent characteristics of this fiber and of asbestos fiber. These differences can readily be seen from the following table E and table G taken from pages 10 and 11 of the "Handbook of Asbestos Textiles," third edition, published by the Asbestos Textile Institute. Table E shows that asbestos fiber has a surface area which is as much as 70 times as great as that of nylon. Moreover, since as shown in table G, the diameter of glass fiber is roughly the same as that of nylon, the surface area of asbestos is also up to 70 times as great as that of glass fiber. It can readily be seen why graphite adheres so much more strongly to asbestos fiber than it does to glass fiber.

Lately, attempts have been made to use more sophisticated, aqueous-based graphite-laden dispersions for the same purpose. Such dispersions are available from Joseph Dixon Co., and, differing from the traditional mixture of graphite and oil, they do appreciably penetrate the glass fiber structure. However, similar difficulties have been found with such materials when used with glass or other inorganic fibers. They tend to wear off or, under pressure, blow out of a glass-fiber braided structure more readily than from braided asbestos, since they are not held and protected by the same irregular fibrous structure nor are they suspended in a retained lubricant vehicle. Also, when such dispersions are applied to glass fiber and the packing dries, a hairy, brush-like surface emerges on the outer surface of the packing. Since a prime desideratum of any packing is a smooth, antifrictional surface, such a packing becomes highly suspect from a tactile point of view to the normal user who is accustomed to use "smoothness" of finish as one of the criteria for packing evaluation.

TABLE E

COMPARISON OF SURFACE AREA OF VARIOUS FIBERS WITH ASBESTOS*

| TYPE OF FIBER | SURFACE AREA BY $N_2$ ADSORPTION (SQ. CM./GRAM) |
|---|---|
| Nylon | 3,100 |
| Acetate Rayon | 3,100 |
| Cotton | 7,200 |
| Silk | 7,600 |
| Wool | 9,600 |
| Viscose Rayon | 9,800 |
| Asbestos (Chrysotile) | 130,000 to 200,000+ |

*Canadian Mining Metallurgical Bulletin, April, 1951
+Recent studies show that the maximum surface area may run as high as 500,000 sq. cm./gram.

TABLE G

COMPARISON OF DIAMETERS OF VARIOUS FIBERS WITH ASBESTOS*

| TYPE OF FIBER | FIBER DIAMETER (INCHES) | FIBRILS IN ONE LINEAR INCH |
|---|---|---|
| Human Hair | 0.00158 | 630 |
| Ramie | 0.000985 | 1,015 |
| Wool | 0.0008 to 0.0011 | 910 to 1,250 |
| Cotton | 0.0004 | 2,500 |
| Rayon | 0.0003 | 3,300 |
| Nylon | 0.0003 | 3,300 |
| Glass | 0.00026 | 3,840 |
| Rock Wool | 0.000142 to 0.000284 | 3,520 to 7,040 |

TABLE G-continued

COMPARISON OF DIAMETERS OF VARIOUS FIBERS WITH ASBESTOS*

| TYPE OF FIBER | FIBER DIAMETER (INCHES) | FIBRILS IN ONE LINEAR INCH |
|---|---|---|
| Asbestos (Chrysotile) | 0.000000706 to 0.00000118 | 850,000 to 1,400,000 |

*Canadian Mining and Metallurgical Bulletin, April, 1951.

Accordingly, it would be highly desirable to develop a non-asbestos packing which enjoys the advantage of resilience contributed by suitable filaments and in which the solid lubricant is relatively inexpensive, and, most important, in which the solid lubricant is retained, even when subjected to contact with water or steam. The packing taught herein meets these objectives.

SUMMARY OF THE INVENTION

A packing material in accordance with the present invention, whether braided, knitted or both, derives its resilience and good thermal conductivity from inorganic fiber such as glass fiber, quartz fiber, ceramic fiber, carbon fiber, graphite fiber or a combination thereof, asbestos fiber being excluded from the category as the term, "inorganic fiber" will be used herein. To render the packing essentially leak-proof, the packing, in addition to the inorganic fiber, contains dispersed polytetrafluoroethylene (TFE) and is taken to a temperature high enough to decompose wetting agent used in preparation of the TFE dispersion but not high enough to sinter the particles of the dispersion. The decomposition temperature is generally considered to be from 375° to 600° F. but we have operated the decomposition step at temperatures as high as 650° F. The removal of the wetting agent by decomposition eliminates the danger of elution of the TFE when used in contact with water or steam. The TFE not only serves to prevent the passage of liquid through the packing but also serves as a lubricant, and, in addition can act, in quantities as low as 5%, based on the weight of inorganic fiber in the packing, to hold dispersed graphite in the packing when used in combination therewith. Dispersed graphite is a desirable component since it serves as an auxiliary low cost lubricant and can thereby reduce the need for the much more expensive TFE dispersion.

The quantity of dispersed TFE prior to removal of the wetting agent and associated water may vary some 5% to 100% based on the total weight of the fiber or fibers. However, due to its high price, it is preferably used in quantity from 5 to 20% based on the total weight of the fiber or fibers. As to the graphite, this may vary from 5% to 100% based on the weight of fiber and is preferably in the range of from 5% to 50% again, based on the weight of said fiber.

The packing may also include an organic fiber sufficiently stable thermally to withstand the temperature necessary to decompose the wetting agent used in preparing the TFE dispersion. A suitable organic fiber is TFE fiber. Another suitable fiber is aramid. The quantity of organic fiber used may vary from 5 to 75% of the total weight of the fibers and is preferably from 5 to 50%. Dispersed graphite may also be used in the packing containing organic fiber, the quantity of dispersed graphite varying between 5 and 100% of the weight of the fibers and being preferably between 5 and 50% of said weight.

The method of preparing the low-friction water and steam-resistant packing of the present invention comprises the steps of combining a suitable organic fiber with a TFE dispersion and raising the temperature of the combination to a level high enough so that the wetting agent normally present in the TFE dispersion is decomposed. If desired, graphite dispersion may be added prior to the heating step. Also, an organic fiber sufficiently stable thermally to withstand the temperature at which the wetting agent is decomposed may be combined with the inorganic fiber and TFE dispersion, either with or without added graphite dispersion. Suitable organic fibers are TFE fiber and aramid fiber. The decomposition of the wetting agent may be carried out in the temperature range of 375° F. to 650° F., temperatures in this range being insufficient to cause sintering of the TFE dispersion.

Accordingly, an object of the present invention is a packing of one or more inorganic fibers combined with dispersed TFE as a sealant and lubricant, said packing being essentially free of wetting agent.

Another object of the present invention is a packing based on an inorganic fiber to provide resilience in combination with dispersed TFE and further comprising either or both of an organic fiber and dispersed graphite, the packing being free of wetting agent and consequently resistant to penetration by water or steam.

A further object of the present invention is a low-friction, water and steam-resistant packing based on a fiber of an inorganic material selected from the group consisting of glass, ceramic, quartz, carbon and graphite, the packing including a TFE dispersion free of wetting agent.

An important object of the present invention is a method of preparing a low-friction water and steam-resistant packing based on an inorganic fiber in combination with a TFE dispersion, the combination being free of a wetting agent and where said combination may further comprise one or both of the materials namely, organic fibers and dispersed graphite, the organic fiber being of a material sufficiently stable thermally to withstand the temperature at which the wetting agent in the TFE dispersion is decomposed.

Still other objects and advantages of the invention will in part be obvious and will in part be apparent from the specification.

The invention accordingly comprises the several steps and the relation of one or more of such steps with respect to each of the others, and a composition possessing the features, properties, and the relation of constituents, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings in which.

DESCRIPTION OF THE PREFERRED EMBODIMENTS

Figure 1:
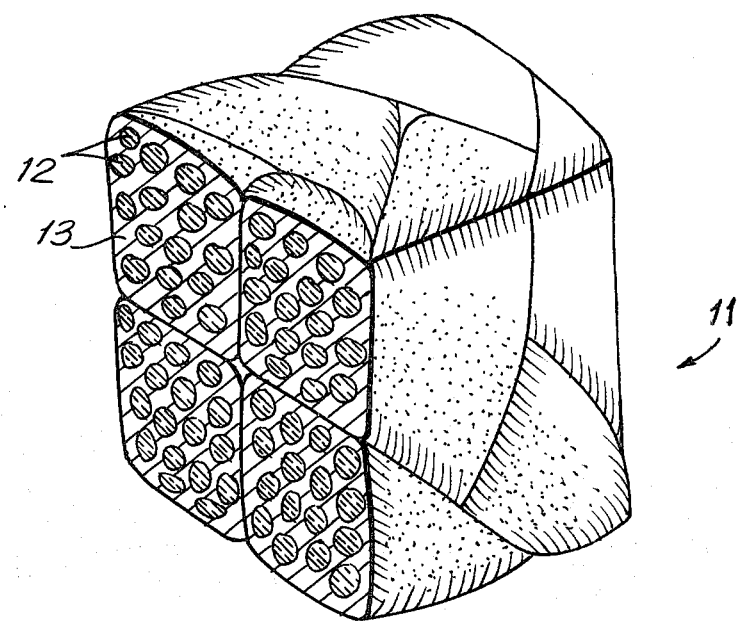
FIG. 1 is a view in perspective of a cut portion of a braided packing comprising an inorganic fiber and TFE dispersion free of wetting agent.

Referring first to FIG. 1, a braided packing in accordance with the present invention is indicated generally by the reference number 11. The packing comprises inorganic fibers 12 in combination with dispersed TFE 13, the braid being essentially free of wetting agent. The TFE functions as sealant against water or steam or organic solvents and as lubricant. In addition, it can serve as binder for dispersed graphite if incorporated as a second lubricant.

As aforenoted, it is important that the wetting agent normally used to form the TFE dispersion be removed since the dispersion is otherwise subject to elution when used as a packing in contact with water or water solutions. The problem is accentuated when the packing is used as a sealant against steam since steam penetrates packing very readily and can also wash out the TFE dispersion, if wetting agent is present thereby rendering the packing incapable of carrying out its intended double function, namely lubricating and sealing.

As inorganic fiber, the structural grade glass, chemical grade glass, electrical grade glass and the special glass fiber sold by Owens-Corning Company as Series AR (an alkali-resistant glass) may be used. Also, fibers of ceramic, quartz, carbon or graphite may be used for special applications, the last two being particularly resistant to a wide variety of chemical agents as well as operable at relatively high temperature. Also, the glass fiber may be texturized to increase its bulk as well as it resilience.

Since a principal objective of the packing of the present invention is to replace the relatively inexpensive asbestos packings, it is desirable that the quantity of the relatively expensive TFE dispersion used be as low as possible. It has been found that quantities as low as 5% by weight, relative to the quantity of inorganic fiber used can provide necessary characteristics. However, it is desirable for many applications that larger quantities of dispersed TFE be present and quantities as high as 100% based on the weight of inorganic fiber may be used. However, in general, it is preferable that the quantity of TFE dispersion used lie in the range from 5 to 40% weight, based on the weight of fiber.

As aforenoted, the diagonal lines in FIG. 1 given the reference 13, indicate TFE dispersion free of wetting agent. However, the diagonal lines in FIG. 1 are also to be taken as indicating the combination of the TFE dispersion in combination with dispersed graphite, the resulting combination being free of both moisture and wetting agent. It is desirable to incorporate the graphite due to its much lower cost than that of the TFE dispersion. As aforenoted, graphite has previously been used in combination with glass fiber but has been found to be unsatisfactory without a binder since under such conditions, it is readily washed or blown out of the packing. We had previously found that TFE dispersion (with wetting agent) can act effectively as a binder for the graphite so that the graphite dispersion can make it possible to achieve the desired lubrication with a smaller quantity of the much more expensive TFE dispersion. To our surprise we found that the TFE dispersion was more effective after freeing same of wetting agent with the economically beneficial consequence that a smaller and hence less costly quantity of TFE dispersion relative to powdered graphite can achieve the same results. The quantity of graphite used in such a combination may vary from 5 to 100%, based on the weight of fiber, but is preferably from 5 to 50%, based on the weight of said fiber.

We have also found that the inorganic fiber may profitably be combined with organic fiber for the purpose of minimizing self-abrasion of the inorganic fibers against each other and thus increasing the life of the packing, particularly where the packing is used against a moving shaft. The organic fiber must, of course, be sufficiently stable thermally so that it can be subjected to the temperature necessary to decompose the wetting agent. Suitable fibers are sintered TFE fiber and aramid fiber.

Figure 2:
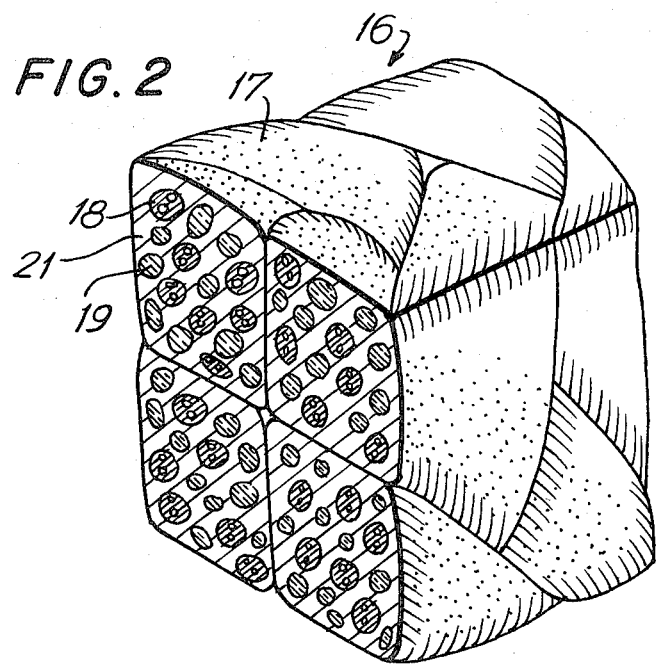
FIG. 2 is a similar view of a packing in which inorganic fiber yarn has been combined with organic fiber prior to braiding.

FIG. 2 shows a braided packing represented generally by the reference numeral 16 in which strands 17 each contain both organic fibers 18 and inorganic fibers 19 lubricated and sealed by dispersed TFE 21, with or without dispersed graphite, the entire structure being essentially free of wetting agent.

Figure 3:
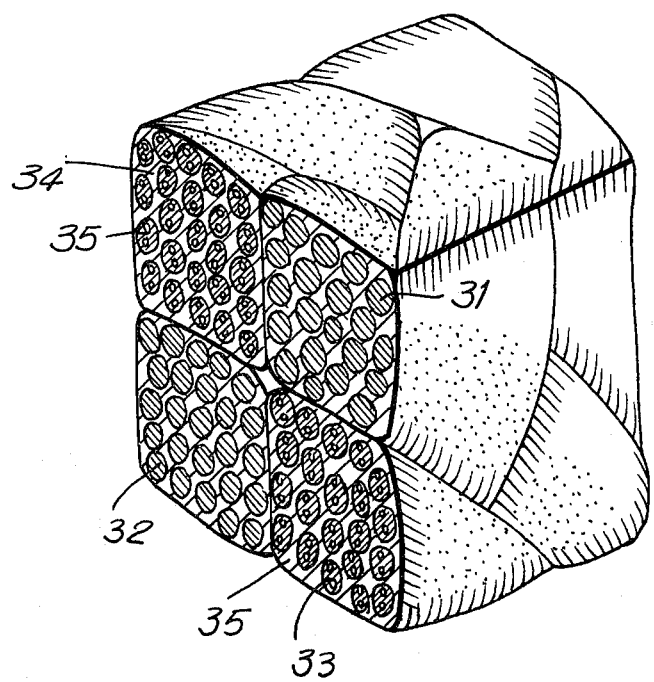
FIG. 3 is a similar view of a braided packing in which separate yarns of inorganic fiber and organic fiber has been braided together, the lubricant in the cases of FIGS. 2 and 3 being dispersed TFE with or without dispersed graphite, the packing being free of wetting agent.

In the braid of FIG. 3, strands 31 and 32 are of inorganic fiber and strands 33 and 34 are of organic fiber, the entire braid being sealed and lubricated by TFE dispersion 35, either with or without dispersed graphite, the entire structure being free of wetting agent.

In the structures of FIGS. 2 and 3 the weight of organic fiber may vary from 5 to 100% and preferably from 5 to 50% of the total weight of the fibers. It should be noted that the Figures are not to scale. Again, the quantity of dispersed graphite present in the structures of FIGS. 2 and 3 may vary from 5 to 100% and are preferably from 5 to 50% of the weight of fiber present.

Figure 4:
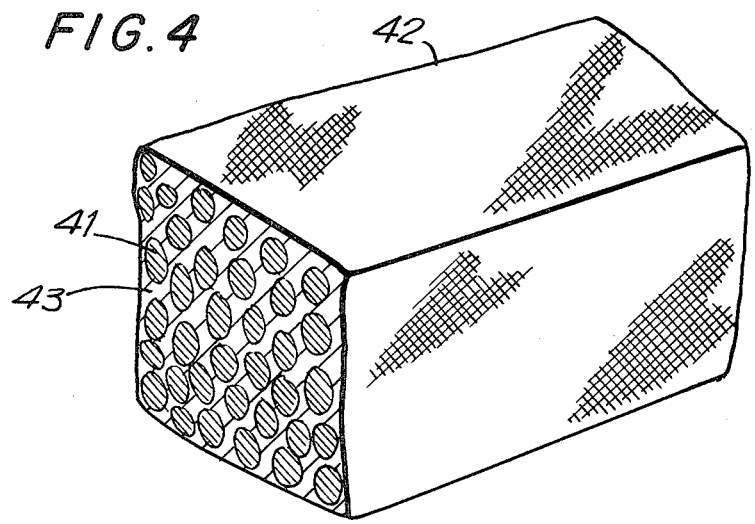
FIG. 4 is a similar view of a knitted packing in accordance with the invention.

FIG. 4 shows a packing in which the reference numeral 41 indicates inorganic fibers in combination with TFE or aramid fibers, the combination being knitted to form a packing 42, and lubricated by dispersed TFE, and optionally TFE combined with dispersed graphite. The lubricant being indicated by the reference numeral 43. Again, the structure is essentially free of wetting agent.

The method of preparing the packings of the present invention comprises the steps of impregnating the packing either before or after forming into a braid or other shape with the planned lubricant-sealant and taking the temperature of the combination to a level such that the wetting agent present is essentially completely decomposed, the temperature level being below that necessary for sintering of the TFE dispersion. Preferably, the inorganic fiber is impregnated with the lubricant-sealant prior to braiding or knitting since the presence of a lubricant will help to avoid abrasion during the forming operation. Again, if organic fiber is to be used in combination with the inorganic fiber, it is desirable to form strands of the combination prior to braiding or knitting, the combination being less likely to abrade when each strand is of one material only.

Temperatures between 370° F. and 650° F. have been found suitable for decomposing the wetting agent without sintering the TFE dispersion.

As is well known, virtually no packing can be considered to be absolutely leak-proof, especially when subjected to a large difference in pressure. Packings containing wetting agent have been particularly susceptible to elution and loss of the necessary characteristics for maintaining adequate resistance to leakage of vessel contents therethrough. However, packings in accordance with the present invention have proved to be as resistant to water and steam leakage as to leakage of organic solvents. Moreover, this improved performance with respect to leakage has been achieved without any increase in the coefficient-of-friction of the packing, and, at relatively low cost.

It will thus be seen that the objects set forth above, among those made apparent from the preceding description, are efficiently attained and, since certain changes may be made in carrying out the above method (process) and in the composition set forth without departing from the spirit and scope of the invention, it is intended that all matter contained in the above description and shown in the accompanying drawing(s) shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A low-friction, water and steam-resistant packing suitable for both static and dynamic applications, said packing comprising inorganic fiber selected from the group consisting of chemical, electrical, structural and alkali resistant glasses, ceramic, quartz, carbon and graphite materials and dispersed and dried but unsintered polytetrafluoroethylene (TFE), said packing being essentially free of wetting agent.

2. The packing as defined in claim 1, wherein said material is one of said glasses.

3. The packing as defined in claim 2, wherein said glass fiber is texturized.

4. The packing as defined in claim 1, wherein said material is graphite in the form of fiber.

5. The packing as defined in any of claims 1, 2, 3 or 4, wherein said dispersed TFE amounts to from 5% to 100% of the weight of said fiber.

6. The packing as defined in claims 1, 2, 3 or 4 wherein said dispersed TFE amount to from 5 to 20% based on the weight of said fiber.

7. The packing as defined in claim 1 or 2, further comprising the inorganic lubricant, dispersed graphite.

8. The packing as defined in claim 7, wherein said dispersed graphite is present in an amount from 5% to 100% based on the weight of said fiber.

9. The packing as defined in claim 1, wherein said content of said dispersed graphite is from 5% to 50% based on the weigh of said fiber.

10. The packing as defined in claim 1, further comprising an organic fiber sufficiently stable thermally to withstand the temperature necessary to decompose wetting agent initially present in said dispersed TFE.

11. The packing as defined in claim 10, wherein said organic fiber is TFE fiber.

12. The packing as defined in claim 10, wherein said organic fiber is aramid.

13. The packing as defined in claim 10, wherein said organic fiber amounts to from 5 to 100% of the weight of said inorganic fiber.

14. The packing as defined in claim 13 wherein said organic fiber amounts from 5 to 50% of the weight of said inorganic fiber.

15. The packing as defined in claim 10, wherein said packing further comprises dispersed graphite in an amount from 5 to 100% of the weight of said fibers.

16. The packing as defined in claim 10 wherein said packing further comprises dispersed graphite in an amount from 5 to 50% of the weight of said fibers.

17. A method of preparing a low-friction, water and steam-resistant packing comprising the steps of combining an inorganic fiber of a material selected from the group consisting of chemical, electrical, structural and alkali-resistant glasses, ceramic, quartz, carbon and graphite, with a polytetrafluoroethylene (TFE) dispersion containing a wetting agent, and heating the resulting combination to a temperature high enough to decompose the wetting agent but insufficiently high to sinter the particles of the dispersion.

18. The method as defined in claim 17, further comprising the step of combining a graphite dispersion with said inorganic fiber and said TFE dispersion prior to said heating of said combination.

19. The method as defined in claim 17, further comprising the step of adding to said combination prior to said heating step a quantity of an organic fiber sufficiently stable thermally to withstand said heating step.

20. The method as defined in claim 17, 18 or 19, wherein said fiber is TFE fiber in an amount from 5 to 100% based on the weight of said packing.

21. The method as defined in claim 17, 18 or 19, wherein said fiber is aramid fiber in an amount from 5 to 100% based on the weight of said packing.

22. The method as defined in claim 18 or 19 wherein said graphite is present in an amount from 5 to 100% based on the weight of said fiber.

23. The method as defined in claim 18 or 19 wherein said graphite is present in an amount from 5 to 50% based on the weight of said fiber.

24. The method as defined in claim 17, wherein said decomposition step is effected at a temperature between 375° F. and 650° F.

25. The method as defined in claim 17, 18 or 19 wherein said fiber is treated with a lubricant prior to forming said fiber into a packing, said lubricant being a member of the group consisting of TFE dispersion and TFE dispersion in combination with dispersed graphite.

* * * * *